(12) United States Patent
Foulk, Jr.

(10) Patent No.: US 6,604,590 B2
(45) Date of Patent: Aug. 12, 2003

(54) BATTERY POWERED, ALL-TERRAIN VEHICLE FOR THE PHYSICALLY CHALLENGED

(76) Inventor: Robert Foulk, Jr., 420 Donald Jackson, Jackson, MO (US) 63755

( * ) Notice: Subject to any disclaimer, the term of this patent is extended or adjusted under 35 U.S.C. 154(b) by 0 days.

(21) Appl. No.: 09/767,970

(22) Filed: Jan. 23, 2001

(65) Prior Publication Data

US 2001/0045308 A1 Nov. 29, 2001

(51) Int. Cl.[7] ................................................. B60K 1/00
(52) U.S. Cl. ..................... 180/65.1; 180/6.7; 180/9.23; 180/907; 180/908
(58) Field of Search ............................... 180/65.1, 65.6, 180/6.7, 9.23, 9.42, 907, 908

(56) References Cited

U.S. PATENT DOCUMENTS

| 2,614,642 | A | * | 10/1952 | Dumais | ..................... 180/6.7 |
| 3,259,200 | A | * | 7/1966 | Maijala | ..................... 180/9.23 |
| 3,994,509 | A | | 11/1976 | Schaeffer | |
| 4,354,691 | A | | 10/1982 | Saunders et al. | |
| 4,682,784 | A | | 7/1987 | Anderson | |
| 4,892,323 | A | | 1/1990 | Oxford | |
| 5,020,818 | A | | 6/1991 | Oxford | |
| 5,137,102 | A | * | 8/1992 | Houston, Sr. et al. | ...... 180/907 |
| 5,149,118 | A | | 9/1992 | Oxford | |
| 5,293,950 | A | * | 3/1994 | Marliac | ..................... 180/907 |
| 5,312,127 | A | | 5/1994 | Oxford | |
| 5,327,989 | A | * | 7/1994 | Furuhashi et al. | .......... 180/908 |
| 5,427,398 | A | | 6/1995 | Weybrecht | |
| 5,435,404 | A | | 7/1995 | Garin, III | |
| 5,518,081 | A | | 5/1996 | Thibodeau | |
| 5,577,567 | A | * | 11/1996 | Johnson et al. | ............. 180/9.23 |
| 6,125,957 | A | * | 10/2000 | Kauffmann | ................. 180/65.1 |

FOREIGN PATENT DOCUMENTS

| DE | 3832344 | * | 3/1990 | .................. 180/907 |
| DE | 4310394 | * | 10/1994 | .................. 180/6.7 |
| GB | 2132954 | * | 7/1984 | .................. 180/907 |
| GB | 2134056 | * | 8/1984 | .................. 180/907 |
| JP | 2-109727 | * | 4/1990 | .................. 180/908 |

* cited by examiner

*Primary Examiner*—Frank Vanaman
(74) *Attorney, Agent, or Firm*—John D. Gugliotta

(57) ABSTRACT

A battery powered, all-terrain vehicle for the physically challenged comprises a battery powered transportation unit that allows a handicapped person to travel on otherwise inaccessible terrain.

7 Claims, 3 Drawing Sheets

BATTERY POWERED, ALL-TERRAIN VEHICLE FOR THE PHYSICALLY CHALLENGED

RELATED APPLICATIONS

The present invention was first described in U.S. Provisional Patent Application No. 60/103,811, filed on Oct. 9, 1998, previously abandoned. No filing date priority is claimed herein.

BACKGROUND OF THE INVENTION

1. Field of the Invention

The present invention relates generally to vehicles for the handicapped, and, more particularly, to a battery powered, all-terrain vehicle for the physically challenged.

2. Description of the Related Art

Handicapped people that are confined to wheelchairs are faced with obstacles on a daily basis that most of us take for granted. Simple travel from place to place becomes a major undertaking that requires considerable effort. Fortunately, the public is becoming increasingly aware of the difficulties that these people face and are responding in a positive manner.

For example, legislation such as the Americans with Disabilities Act imposes responsibilities upon the public sector to make provisions to accommodate the physically handicapped so that they may gain access to, and take advantage of, the various goods and services available to others. Unfortunately, however, there are many aspects in which our society has failed to respond thus far in addressing this issue. Disabled persons confined to wheelchairs are still prevented from access to many places in which the terrain prohibits the use of conventional wheelchairs.

As a result, there exists a need for a solution to this problem in which a means is provided that allows handicapped people to gain access to the many parks, trails and nature preserves that currently pose such an obstacle.

In the related art, several devices attempt to address the problems associated with improving transportation and mobility of handicapped persons.

U.S. Pat. No. 5,020,818, issued in the name of Oxford, discloses an all-terrain wheelchair in which tracked propulsion means are anticipated.

Two patents disclose attachments for securing to conventional wheelchairs that are intended to permit the user to travel a more rugged terrain. These devices are disclosed in U.S. Pat. No. 5,312,127, issued in the name of Oxford and U.S. Pat. No. 5,427,398, issued in the name of Weybrecht.

Several patents disclose three-wheeled configurations for an all-terrain wheelchair designs that are intended to give the user a more versatile turning capabilities and the ability to travel a more rugged terrain. These include U.S. Pat. No. 4,892,323, issued in the name of Oxford, U.S. Pat. No. 5,149,118, issued in the name of Oxford and U.S. Pat. No. 5,518,081, issued in the name of Thibodeau.

U.S. Pat. No. 5,435,404, issued in the name of Garin, III, discloses a wheelchair design that is intended to give the user enhanced maneuverability.

Several patents disclose devices designed to provide enhanced propulsion means for an otherwise conventional wheelchair. These include U.S. Pat. No. 3,994,509, issued in the name of Schaeffer, U.S. Pat. No. 4,682,784, issued in the name of Anderson and U.S. Pat. No. 4,354,691, issued in the name of Saunders et al.

The previous devices suffer from one or more of the following drawbacks. First, since otherwise conventional wheelchairs are utilized, limitations inherent in the wheelchair design prevail, such as thin tires that get caught in mud. Second, the devices have a propensity to tip. Third, arm strength required to move a wheelchair or similar device through tough terrain is an undue burden on the sick, elderly and young who are in temporarily or permanently confined to a wheelchair. Fourth, the maneuverability of these devices is limited.

A search of the prior art did not disclose any patents that read directly on the claims of the instant. Consequently, a need has been felt for providing an apparatus and method which overcomes the problems cited above.

SUMMARY OF THE INVENTION

It is therefore an object of the present invention to provide an improved battery powered, all-terrain vehicle for the physically challenged that provides the handicapped with access to parks, trails and the like.

Briefly described according to one embodiment of the present invention, a battery powered, all-terrain vehicle for the physically challenged is disclosed, comprising a battery powered transportation unit that allows a handicapped person to travel on otherwise inaccessible terrain.

The present invention consists of a main body, of a generally horizontally extending, rectangular frame configuration. The upper portion of the main body comprises an operations chamber, wherefrom the user operates the present invention. The operations chamber houses a cushioned, ergonomic seat, shoulder harness and leg rest, as well as other amenities to ensure the comfort of the user during operation.

Control of the present invention is facilitated via at least one control means, such as a joystick. The control means is attached to a control means mount. The control means mount is of a generally inverted-L configuration, attached to the lateral side of the operations chamber, and extending laterally toward the center of the operations chamber, so as to be within easy reach of the operator when in the seated position. The horizontal portion of the control means mount pivots so as to permit the control means to swing into position during use and out of the operator's way during mount and dismount from the present invention.

A frame-type roll cage is mounted on the top of the main body, and is configured to protect the user in case the present invention tips over.

An electric drive unit is located inside the main body, under the operations chamber. The electric drive unit consists of a plurality of batteries, at least one electric motor, at least one gearbox, and requisite wiring generally known in the art. The electric motors utilized by the present invention are similar in nature to the high torque models used to propel conventional electric wheelchairs. In this way, the electric drive unit powers the present invention, providing movement of the present invention over various terrains.

Placement of the electric drive unit below the operations chamber was designed to lower the center of gravity of the present invention.

The electric drive unit is connected to a drive frame. The drive frame is mounted to the lower portion of the main body, on both sides of the main body, via hinges. The drive frame consists of pair of rubberized or plastic tracks similar to those used in bulldozers, tanks and the like.

A plurality of major drive wheels are used to guide the tracks, in conjunction with a plurality of minor drive wheels, located along each drive frame.

A lateral track shield is mounted to the exterior lateral surface of each set of major drive wheels. The outer shield is of a generally horizontal configuration, positioned vertically, so as to provide a physical barrier to debris and mud entering and interfering with the internal components of the drive frame.

Top track shields, of a generally horizontally elongated, rectangular configuration, are located above the tracks. The top track shields extend outward laterally from the main body, and are configured to stop debris from the tracks from entering the operations chamber.

The use of the dual-track configuration gives the unit a zero turning radius and the ability to navigate more difficult terrain. The tracks are designed to handle travel over objects and obstacles that would be impossible to pass over in a conventionally equipped wheelchair.

It is another object of the present invention to provide a device with a sturdy frame structure that is strong, durable, and protects the user in case of accidental tipping.

It is another object of the present invention to provide a device that is resistant to tipping. This is accomplished via a wide lateral profile and a low center of gravity.

It is another object of the present invention to provide a device that is ergonomically designed, thus being comfortable for physically challenged individuals to ride in and operate.

It is another object of the present invention to provide a device that is safe to ride and operate.

It is another object of the present invention to provide a device that is easy to maneuver.

It is another object of the present invention to provide a device that has a zero-turning radius.

It is another object of the present invention to provide a device that is easy to operate.

It is another object of the present invention to provide a device that is self-powered.

It is another object of the present invention to provide a device that has sufficient torque to permit the present invention to traverse difficult terrain in safety.

It is another object of the present invention to provide a device that will not become stuck in the mud or low level water, such as streams and cricks.

DESCRIPTIVE KEY

| | |
|---|---|
| 10 battery powered, all-terrain vehicle for the physically challenged | 100 batteries |
| | 110 electric motor |
| | 120 gearbox |
| 15 main body | 122 prop shaft |
| 20 operations chamber | 125 drive frame |
| 30 seat | 130 front spindle |
| 40 shoulder harness | 140 track |
| 50 leg rest | 150 major drive wheel |
| 60 control means | 160 minor drive wheel |
| 70 control means mount | 170 lateral track shield |
| 80 roll cage | 180 top track shield |
| 90 electric drive unit | |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 6.

1. Detailed Description of the Figures

Figure 1:
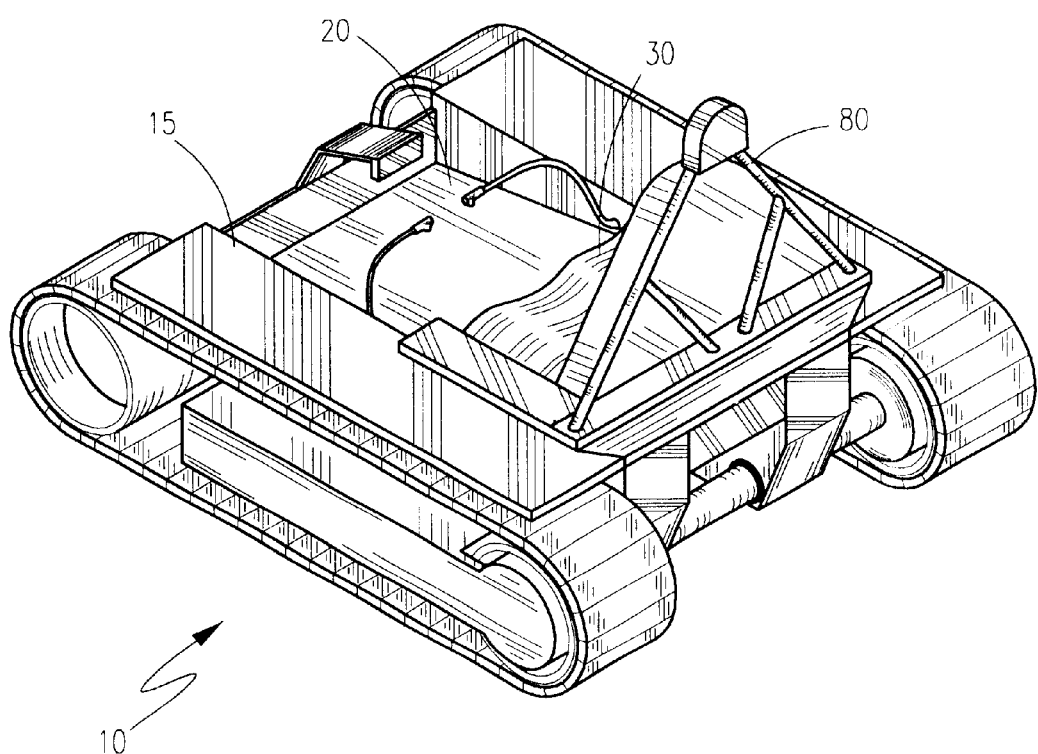
FIG. 1 is a perspective view of the preferred embodiment of battery powered, all-terrain vehicle for the physically challenged 10.

Referring now to FIG. 1, a battery powered, all-terrain vehicle for the physically challenged 10 is shown, according to the present invention, comprises a battery powered transportation unit that allows a handicapped person to travel on otherwise inaccessible terrain.

The present invention consists of a main body 15, of a generally horizontally extending, rectangular frame configuration. The upper portion of the main body 15 comprises an operations chamber 20, wherefrom the user operates the present invention.

Figure 2:
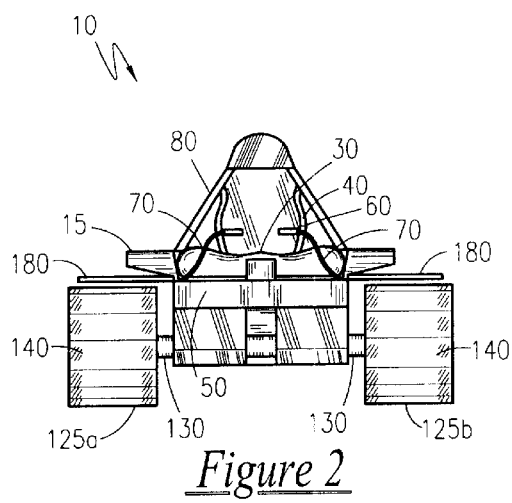
FIG. 2 is a front view thereof.

Referring now to FIGS. 1 & 2, the operations chamber 20 houses a cushioned, ergonomic seat 30, shoulder harness 40 and leg rest 50, as well as other amenities to ensure the comfort of the user during operation.

Referring now to FIG. 2, control of the present invention is facilitated via at least one control means 60, such as a joystick. The control means 60 is attached to a control means mount 70. The control means mount 70 is of a generally inverted-L configuration, attached to the lateral side of the operations chamber 20, and extending laterally toward the center of the operations chamber 20, so as to be within easy reach of the operator when in the seated position. The horizontal portion of the control means mount 70 pivots so as to permit the control means 60 to swing into position during use and out of the operator's way during mount and dismount from the present invention. The control means 60 and control means mount 70 work in conjunction to pivot along the directional line indicated by the dual headed arrow A–B, wherein the control means 60 and control means mount 70 are shown in phantom and illustrate the motion necessary to allow ingress into and egress from the apparatus.

A frame-type roll cage 80 is mounted on the top of the main body 15, and is configured to protect the user in case the present invention tips over.

An electric drive unit 90 is located inside the main body 15, under the operations chamber 20, at the rear of the present invention. The electric drive unit 90 consists of a plurality of batteries 100, at least one electric motor 110, a plurality of gearboxes 120, and requisite wiring generally known in the art. The electric motors 110 utilized by the present invention are similar in nature to the high torque models used to propel conventional electric wheelchairs. In this way, the electric drive unit 90 powers the present invention, providing movement of the present invention over various terrains.

Figure 4:
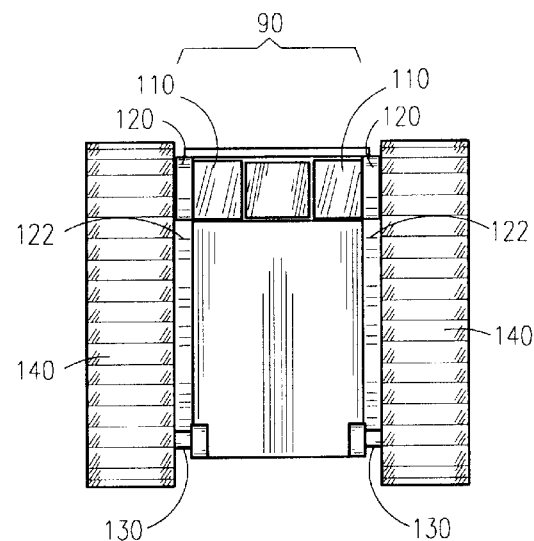
FIG. 4 is a bottom view thereof.

Referring now to FIG. 4, placement of the electric drive unit 90 below the operations chamber 20 was designed to lower the center of gravity of the present invention.

Figure 3:
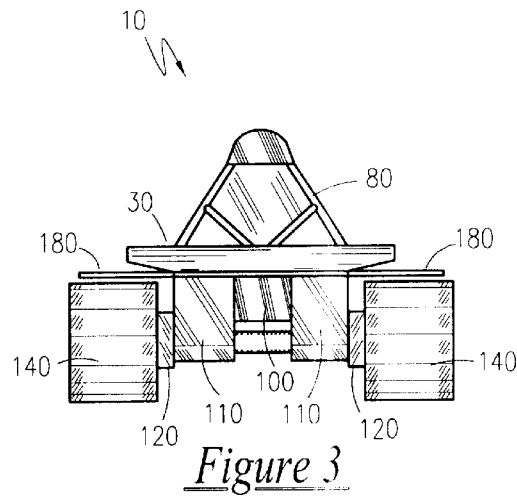
FIG. 3 is a rear view thereof.

Referring now to FIGS. 3 & 4 the system is configured such that the batteries 100 drive the electric motors 110, that turn the gear boxes 120. Prop shafts 122 extend from the gear boxes 120 to front spindles 130. The front spindles 130 are attached to the bottom of the main body 15, near the front of the present invention, connects to and provides power to the major drive wheels 150 located at the front of the present invention.

Referring now to FIG. 2, a drive frame 125 is mounted to the lower portion of the main body 15, on both sides of the main body 15, via hinges 130. The gear boxes 120 are connected to the drive frame 125.

Figure 5:
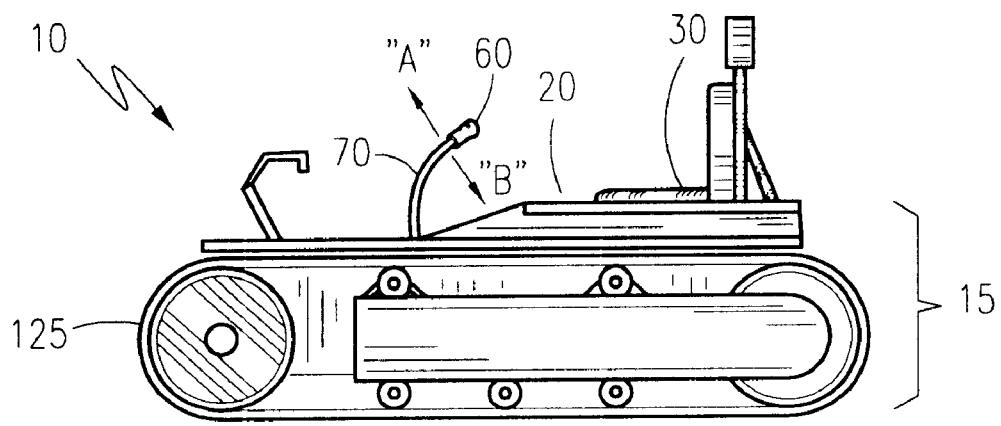
FIG. 5 is a left side view thereof, the right side being a mirror image thereof.
Figure 6:
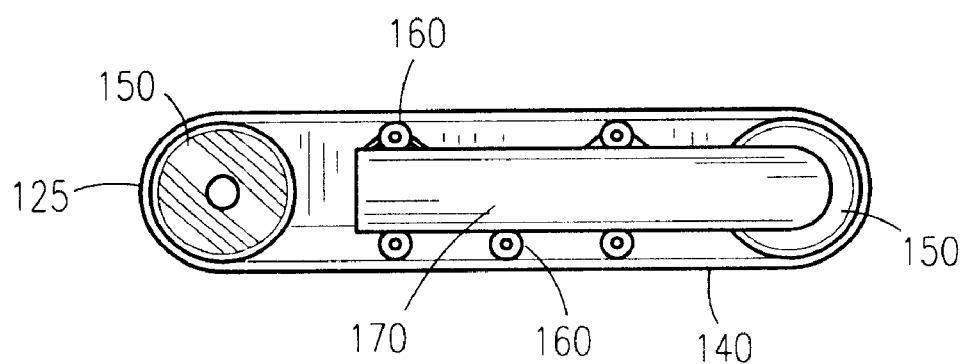
FIG. 6 is a side view of a drive frame.

Referring now to FIGS. 5 & 6, the drive frame 125 consists of pair of rubberized or plastic tracks 140 similar to those used in bulldozers, tanks and the like. A plurality of major drive wheels 150 are used to guide the tracks 140, in conjunction with a plurality of minor drive wheels 160, located along each drive frame 125.

A lateral track shield 170 is mounted to the exterior lateral surface of each set of major drive wheels 150. The lateral track shield 170 is of a generally horizontal configuration, positioned vertically, so as to provide a physical barrier to debris and mud entering and interfering with the internal components of the drive frame 125.

Referring now to FIGS. 1 & 2, top track shields 180, of a generally horizontally elongated, rectangular configuration, are located above the tracks 140. The top track shields 180 extend outward laterally from the main body 15, and are configured to stop debris from the tracks 140 from entering the operations chamber 20.

The use of the dual-track configuration gives the unit a zero turning radius and the ability to navigate more difficult terrain. The tracks 140 are designed to handle travel over objects and obstacles that would be impossible to pass over in a conventionally equipped wheelchair.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention, the operator: first, enters the present invention from the front; second, sits down in the seat 30; third, connects the shoulder harness 40; fourth, turns the present invention on; fifth, positions the control means 60 in front of him or her; sixth, uses the control means 60 to maneuver the present invention over terrain and to stop the present invention.

The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. An all-terrain vehicle for the physically challenged comprising:

a main body, said main body being of a generally horizontally extending, rectangular frame configuration;

an operations chamber, said operations chamber comprising the upper portion of said main body, wherefrom a user operates said vehicle;

control means, said control means used to control said vehicle, and said control means capable of pivoting into position and then away from said user when not in use;

a roll cage, said roll cage mounted on top of the main body, and configured to protect said user in case vehicle tips over;

an electric drive unit, located inside said main body and below said operations chamber so as to provide a lower center of gravity for said vehicle, said electric drive unit comprising a plurality of batteries, at least one electric motor, a plurality of gearboxes, and electrical wiring; such that said batteries drive said electric motors that turn said gear boxes and prop shafts, said prop shafts extending from said gear boxes to front spindles attached to the bottom of the main body, near the front of said vehicle, connected to and providing power to major drive wheels; and a pair of drive frames, said pair of drive frames comprising a first drive frame and a second drive frame.

2. The all-terrain vehicle for the physically challenged of claim 1, wherein said operations chamber houses a cushioned, ergonomic seat, shoulder harness and leg rest.

3. The all-terrain vehicle for the physically challenged of claim 1, wherein said control means comprises a joystick attached to a control means mount of a generally inverted-L configuration, attached to a lateral side of said operations chamber, and extending laterally toward a center of said operations chamber, so as to be within easy reach of said user when in the seated position.

4. The all-terrain vehicle for the physically challenged of claim 3, wherein the horizontal portion of said control means mount pivots so as to permit said control means to swing into position during use and out of said user's way during mount and dismount from said vehicle.

5. The all-terrain vehicle for the physically challenged of claim 1, wherein said drive frame comprises a pair of rubberized or plastic tracks and said major drive wheels to guide said tracks, in conjunction with a plurality of minor drive wheels, located along said first and said second drive frames.

6. The all-terrain vehicle for the physically challenged of claim 1, further comprising a lateral track shield, said lateral track shield mounted to the exterior lateral surface of said major drive wheels.

7. The all-terrain vehicle for the physically challenged of claim 6, further comprising top track shields, of a generally horizontally elongated, rectangular configuration, each said track shield located above said tracks.

* * * * *